(12) United States Patent
Yatsu (10) Patent No.: US 6,771,455 B1
(45) Date of Patent: Aug. 3, 2004

(54) CONTROL SYSTEM AND CONTROL METHOD FOR POSITIONING A HEAD ABOVE A DESIRED POSITION ON DISK

(75) Inventor: Masahide Yatsu, Akishima (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 561 days.

(21) Appl. No.: 09/656,445

(22) Filed: Sep. 6, 2000

(30) Foreign Application Priority Data

Sep. 6, 1999 (JP) .......................................... 11-251927

(51) Int. Cl.[7] .............................................. G11B 5/596
(52) U.S. Cl. ..................................... 360/77.06; 360/75
(58) Field of Search .............................. 362/75, 78.02, 362/77.08, 77.01, 77.06

(56) References Cited

U.S. PATENT DOCUMENTS

| | | | | |
|---|---|---|---|---|
| 5,325,247 | A | 6/1994 | Ehrlich et al. | 360/78.09 |
| 5,680,271 | A | 10/1997 | Yatsu | 360/78.09 |
| 6,034,834 | A | * 3/2000 | Yoshikawa et al. | 360/75 |
| 6,337,889 | B1 | * 1/2002 | Mita et al. | 360/65 |
| 6,501,610 | B1 | * 12/2002 | Sugawara et al. | 360/65 |
| 6,532,129 | B1 | * 3/2003 | Sri-Jayantha et al. | 360/77.02 |
| 2002/0122269 | A1 | * 9/2002 | Onuki et al. | 360/77.04 |

FOREIGN PATENT DOCUMENTS

| | | |
|---|---|---|
| JP | 8-501667 | 2/1996 |
| JP | 2697641 | 9/1997 |
| JP | 9-282818 | 10/1997 |
| JP | 10-255419 | 9/1998 |

\* cited by examiner

Primary Examiner—David Hudspeth
Assistant Examiner—Rocio Colon
(74) Attorney, Agent, or Firm—Pillsbury Winthrop LLP (57) ABSTRACT

Disclosed herein is a control system designed to position a head provided in a magnetic disk drive. The system has a controller, a signal output section, two gain/phase control sections and an adder. The controller receives data generated from position data extracted from servo data and representing the position of the head and generates, form the data, an operation signal. The operation signal is used in seek control or track following control to move the head to a target position. The signal output section distributes the operation signal to the gain/phase control sections. The gain/phase control sections adjust the phase and gain of the operation signal, independently of each other, generating gain/phases. The operation signals are supplied to the adder. The adder adds the signals, generating a control signal that has a gain smaller than the gain of the operation signal. The control signal is input to the object which is provided in the magnetic disk drive and which is to be controlled. Mechanical resonance is prevented in the actuator incorporated in the disk drive. This minimizes seek noise and enhances operating stability of the disk drive.

4 Claims, 5 Drawing Sheets

FIG. 7B

CONTROL SYSTEM AND CONTROL METHOD FOR POSITIONING A HEAD ABOVE A DESIRED POSITION ON DISK

CROSS-REFERENCE TO RELATED APPLICATIONS

This application is based upon and claims the benefit of priority from the prior Japanese Patent Application No. 11-251927, filed Sep. 6, 1999, the entire contents of which are incorporated herein by reference.

BACKGROUND OF THE INVENTION

This invention relates to a control system and a control method for moving a magnetic head (to be referred to as "head" hereinafter) to a target of a head position above a disk medium (to be referred to as "disk" hereinafter) to which the head should be moved and relating to said control system and said control method for positioning the head at this target of the head position, and in particular relates to a control system and a control method for digitally comparing the head position with a predetermined value and positioning the head above a desired position on the disk due to a feedback control of a controlled object based on the comparison.

The control system for positioning the head above a desired position is mounted in a hard disk drive (to be referred to as "HDD" hereinafter). HDD is a storage device in which information is written on the disk surface of a storage medium, and/or information is read from the disk surface by the head. According to the invented control system, the head is moved to a position above the target track on the disk surface (seek control). The control system also enables the precise positioning of a head within a track range (track following control). The track is part of the disk, where information has been recorded or information can be recorded.

As a control system for positioning the HDD head above a desired position, the sector servo method is known which divides a disk surface into many servo areas and records servo data there. The servo data is a magnetic record of data for positioning a head.

In general, in the sector servo method, the servo data recorded on the disk is read out with a specific sampling interval. The sampling interval is a time interval with which the head reads servo data from the disk. Based on the servo data, an operating signal with which the head will be controlled is provided by a digital circuit. Then an electric current calculated from the operating signal drives an actuator holding the head.

The actuator has a resonance frequency because it is composed of a physical substance. When the actuator is driven, a mechanical resonance phenomenon can take place in the actuator. On the other hand, it is known that the sector servo method relying on digital circuits has difficulty to control frequencies that are higher than half the sampling frequency (referred to as Nyquist Frequency hereinafter). In HDDs, the resonance frequency of the actuator is higher than the Nyquist Frequency in many cases. For example, the Nyquist Frequency is 2–3 kHz in 2.5" HDDs. Most of the resonance frequencies of actuators are 4 kHz or higher. In 2.5" HDDs, therefore, the actuator suffers from resonance affected by the Nyquist Frequency made by the sector servo method relying on digital circuits.

Such a mechanical resonance phenomenon causes an unstable control of actuators and leads to a failure in positioning a head accurately above a desired position. Also during seek control, while the head moves over tracks, vibration of the actuator causes noise (seek noise).

In the head positioning system of prior art, analog-based low-pass filters and notch filters may be added to a driving circuit that provides signals for controlling actuators in order to reduce the influence of the above-mentioned mechanical resonance phenomenon.

An analog-based driving circuit, however, requires many components in its circuit, compared with a digital-based driving circuit. Many components require many steps for their mounting on a circuit board. Increase in the number of components and manufacturing processes leads to a higher manufacturing cost of the driving circuit. As a result, the analog-based driving circuit cost more than those based on the digital circuit. The analog-based driving circuit, therefore, becomes more costly than the digital-based driving circuit.

Many components requires a large circuit board for their mounting. In a large circuit board, the driving circuit becomes large as well. Thus analog-based driving circuits become larger than digital-based driving circuits.

Further, analog-based driving circuits have larger fluctuation in the properties of components, compared with digital-based circuits. Fluctuation in the component properties leads to failures in realizing desired operation. A circuit having such fluctuation in component properties cannot be shipped as a commercial product. The manufacturing yield of analog-based driving circuits becomes thereby lower than that of digital-based driving circuits.

In addition, since analog-based driving circuits are more affected by the operating environment than digital-based driving circuits, their application range and condition are restricted. Analog-based driving circuits are thus used in limited operation environments and conditions. In particular, 2.5" HDDs are often used in operating environments in which temperature and humidity fluctuate significantly. Then the above restriction in terms of operating environments and conditions can be a serious problem for 2.5" HDDs.

Compared with digital-based driving circuits, analog-based driving circuits are difficult to change circuit properties as desired. If the circuit properties are hard to change, it also becomes hard to change the actuator drive mode, and then separate circuits will be necessary in many cases. Then the choice of actuator drive modes is accordingly limited in analog-based driving circuits. For example, in head control systems for using analog-based driving circuits, separate circuits will be necessary for the seek control and the track following control for precision positioning of the head, if a change for operating one selected from the seek and track following controls is needed to the circuit.

As described above, since analog-based driving circuits have many problems, other methods are necessary for a solution to those problems.

In order to raise the Nyquist Frequency, the number of servo areas should be increased to raise the sampling frequency. An increase in the number of servo areas, however, leads to a longer time for the head to consume reading servo data. Then the efficiency in formatting the disk becomes accordingly low. Further, in order to increase the Nyquist frequency, the rotating speed of the disk is required to be large. A large rotating speed, however, leads to a decrease in accuracy for writing data on and reading data from the disk. For a large Nyquist Frequency, a higher performance is required in the CPU but such CPUs are expensive. Then the actuator driving circuit becomes costly.

BRIEF SUMMARY OF THE INVENTION

The primary object of the present invention is to provide a control system and a control method for positioning the head above a desired position on the disk in the disk storage device where factors causing mechanical resonance are effectively restricted and a system stability is secured by installing a notch filter that can work on frequencies higher than the Nyquist Frequency of the digital servo system and then reduce gain in arbitrary frequencies.

Another object of the present invention is to reduce gain in arbitrary frequencies that is determined by the gain and phase characteristics of each signal line by providing such an output that is equal to more than one output of operating signals provided during one sampling interval.

Still another object of the present invention is to reduce fluctuation in characteristics of the circuit for driving the actuator and enable to set the circuit characteristics as desired.

Yet another object of the present invention is to reduce gain in arbitrary frequencies without increasing the number of servo areas per track (namely, without shortening the sampling interval).

In addition, another object of the present invention is to reduce seek noise by reducing the mechanical resonance of the actuator.

According to the present invention, there is provided a control system for moving data-reading means for recording data from a recording medium, to a target position in accordance with a position data read by the data-reading means, the control system comprising:

first control means for generating a first operation signal for moving the data-reading means; and output means for distributing the first operation signal to a plurality of signal lines, the output means comprising:

a plurality of changing means for changing a gain and phase characteristics of the first operation signal distributed to one signal line, provided for the signal lines, respectively, thereby generating a second operation signal; and adding means for adding each of the second operation signals generated by the changing means, thereby generating a third operation signal which has a gain-peak lower than that of the first operation signal, and for outputting the third operation signal as a control signal for controlling the data-reading means as objects.

Further, according to the present invention, there is provided a control method for moving data-reading means for recording data from a recording medium, to a target position in accordance with a position data read by the data-reading means, the control method comprising:

generating a first operation signal for moving the data-reading means; and distributing the first operation signal to a plurality of signal lines, the distributing step comprising:

changing a gain and phase characteristics of the first operation signal distributed to one signal line, provided for the signal lines, respectively, thereby generating a second operation signal; and adding each of the second operation signals generated in the changing step, thereby generating a third operation signal which has a gain-peak lower than that of the first operation signal, and for outputting the third operation signal as a control signal for controlling the data-reading means as objects.

Moreover, according to the present invention, there is provided a control system for use in a disk storage device comprising at least one disk having a recording surface and servo areas arranged at regular intervals in the recording surface, each storing a cylinder address item and a burst data item representing a position at which the address has been written, a spindle motor for rotating the disk, a head for facing the recording surface of the disk, for reading information from the disk and for reading the cylinder address item and burst data item from the disk at a predetermined sampling frequency, an actuator holding the head, for moving the head in a radial direction of the disk, and a position-detecting circuit for detecting a position of the head from the cylinder address item and burst data item read by the head, the control system designed to move the head to a target position in accordance with the position detected by the position-detecting circuit and comprising:

a digital controller for generating, by digital processing, a first operation signal for moving the head, from the position detected by the position-detecting circuit; and a signal output section for distributing the first operation signal to a plurality of signal lines, the signal output section comprising:

a plurality of gain/phase changing sections provided for the signal lines, respectively, each designed to change a gain and phase characteristics of the first operation signal distributed to one signal line, thereby generating a second operation signal; and an adder for adding the second operation signals generated by the gain/phase changing sections, thereby generating a third operation signal which has a gain-peak lower than that of the first operation signal, and for outputting the third operation signal as a control signal for controlling a voice coil motor that drives the actuator.

Furthermore, according to the present invention, there is provided a magnetic recording/reading apparatus for use in a disk storage device comprising at least one disk having a recording surface and servo areas arranged at regular intervals in the recording surface, each storing a cylinder address item and a burst data item representing a position at which the address has been written, a spindle motor for rotating the disk, a head for facing the recording surface of the disk, for reading information from the disk and for reading the cylinder address item and burst data item from the disk at a predetermined sampling frequency, an actuator holding the head, for moving the head in a radial direction of the disk, and a position-detecting circuit for detecting a position of the head from the cylinder address item and burst data item read by the head, the control system designed to move the head to a target position in accordance with the position detected by the position-detecting circuit and comprising:

a digital controller for generating, by digital processing, a first operation signal for moving the head, from the position detected by the position-detecting circuit; and a signal output section for distributing the first operation signal to a plurality of signal lines, the signal output section comprising:

a plurality of gain/phase changing sections provided for the signal lines, respectively, each designed to change a gain and phase characteristics of the first operation signal distributed to one signal line, thereby generating a second operation signal; and an adder for adding the second operation signals generated by the gain/phase changing sections, thereby generating a third operation signal which has a gain-peak lower than that of the first operation signal, and for outputting the third operation signal as a control signal for controlling a voice coil motor that drives the actuator.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The embodiment of the present invention for positioning a head above a desired position on a disk will be described in detail below with reference to the accompanying drawings.

Figure 1:
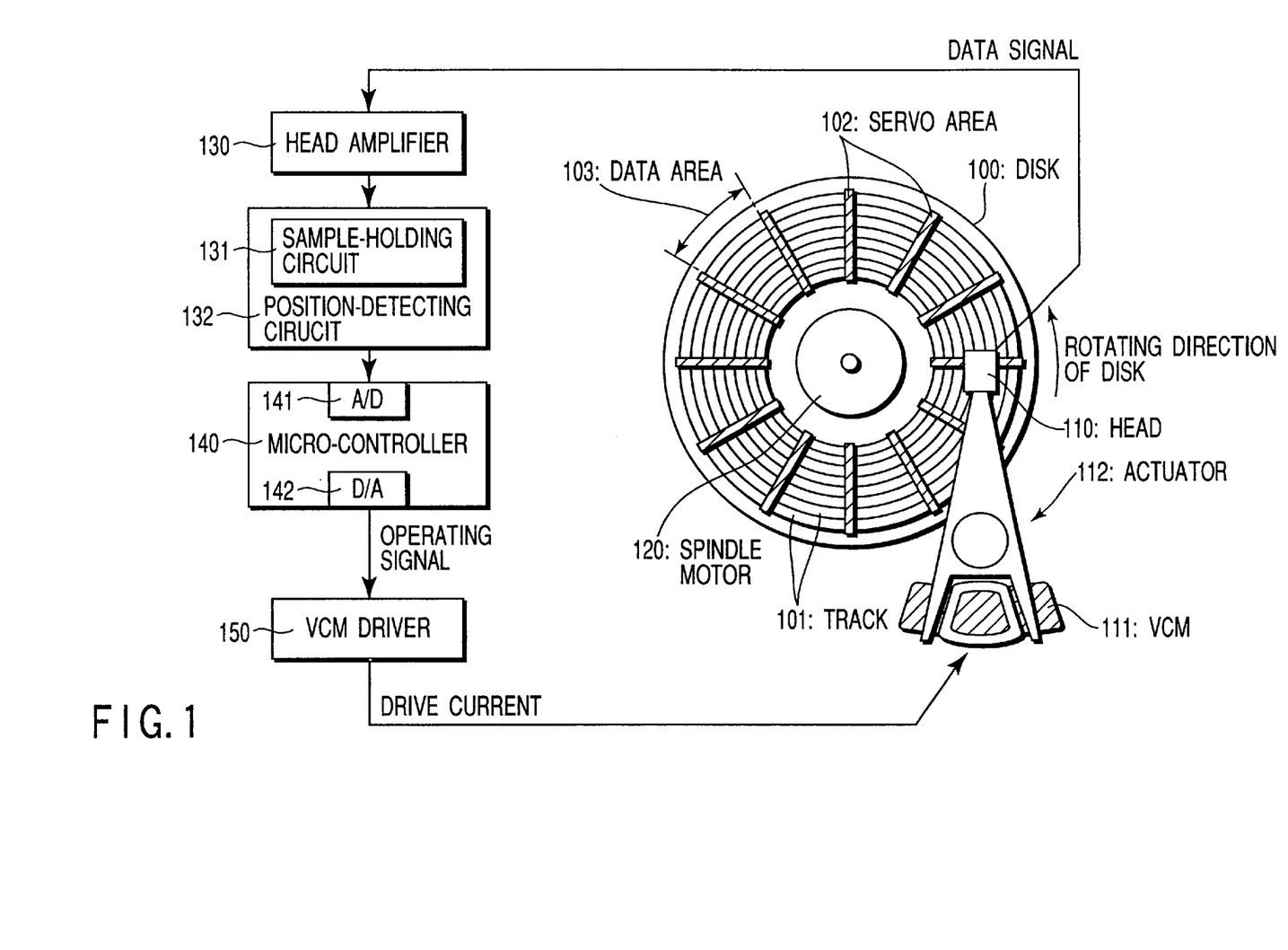
FIG. 1 is a block diagram illustrating the feedback control system that compares the positions of the disk and the head in a HDD with a setting value, and drives the head based on this comparison in the control system according to a first embodiment of the invention.

A control system and a control method according to the embodiment of the invention for positioning a head are described with reference to FIGS. 1–7B. FIG. 1 is a block diagram illustrating a feedback control system that compares a positions of the disk and the head in a HDD with a setting value, and drives the head based on this comparison.

Referring to the HDD shown in FIG. 1, a head 110 is positioned above a recording surface of a disk 100 which is a magnetic disk recording medium. The head 110 has components for reading and recording data, which is faced against the disk surface. The head 110 is held on the top of an actuator 112. This actuator 112 drives the head 110 to a desired position. The actuator 112 is moved in the direction of the radius of the disk 100, driven by a voice coil motor 111 (to be referred to as "VCM" hereinafter). VCM 111 is a driving device for providing a moment due to the motor 111. The head 110 on the actuator 112 is moved in the direction of the radius of the disk 100 in this way, driven by VCM 111. The head 110 is moved to a target position by a series of operations of the actuator 112. At this moment, the distance between the surface of the disk 100 and the head 110 is kept constant. The disk 100, which is held on the motor axis of a spindle motor 120, is rotating at a predetermined high angular speed. In this embodiment of the invention, the number of disk 100 is assumed to be one. However, the invention allows the use of a HDD having a structure in which more than one disk is arranged on each other.

A number of tracks 101 are formed concentrically on the recording surface of the disk 100. The track 101 consists of data areas 103 where data has been magnetically recorded or data can be magnetically recorded, and servo areas 102 where data for positioning a head is magnetically recorded. Servo areas 102 have records of the cylinder address and the burst data (they are collectively called servo data), and being placed on tracks 101 at regular intervals. Namely, servo areas 102 are placed on the disk surface, being aligned radically, and being separated in the rotating direction at regular intervals. Servo areas 102 extend from the center of the disk 100 to outside across tracks 101. The cylinder address is information for identifying each track 101. The burst data is that for precise positioning of the head 110 in each track 101. The control for moving the head 110 to a target track 101, based on the information of cylinder address (also called cylinder code or track address), is referred to as seek control. On the other hand, the control for precise positioning of the head 110 in a predetermined range over a target track 101 is referred to as track following control.

When the head 110 is positioned above the disk 100, servo data is magnetically read from the servo areas 102 by the head 110 at a sampling interval. The sampling interval is duration given by dividing the time for one rotation of the disk 100 by the number of servo areas. Namely, the sampling interval is a time the head takes in reading every servo data area. The servo data read by the head 110 is converted to data signal. The data signal transmitted from the head 110 is entered to a head amplifier circuit 130 that amplifies the data signal. This amplified data signal is then entered to a position-detecting circuit 132. In a sample-holding circuit 131 in the above circuit 132, the amplitude of the burst data is extracted from the servo data and is temporally memorized there. In the position-detecting circuit 132, the cylinder address identification signal is also extracted from the servo data. This identification signal is entered to a micro-controller 140 without changing the signal. In the position-detecting circuit 132, the extracted analog data where the amplitude of the burst data is recorded is converted by an analog/digital (to be referred to as "A/D" hereinafter) converter 141 into digital signal. This digital signal is entered to the e micro-controller 140. In the micro-controller 140, the two entered signals (the cylinder identification signal and the analog signal where the amplitude of burst data is recorded) are referred to, and then it is determined there how to drive the actuator 112 to move the head 110 to a destination head position. Described in further detail, first, when the servo data is sampled, the position of the track 101 where the head 110 stays and the position of the head 110 inside the track are calculated. Next, based on the above information, the rotational operation distance of the actuator 112 is calculated to move the head 110 to a destination head position.

The micro-controller 140 includes an non-volatile memory such as a ROM (Read Only Memory) of which data are not changed and a CPU (Central Processing Unit) that executes the control program recorded in the ROM, and a RAM (Random Access Memory) that temporarily stores data. In the micro-controller 140, a program to control the head to be positioned above a desired position, which is included in the above control program, is executed. Then the head 110 is driven according to the cylinder address data and burst data read by the head 110.

In the micro-controller 140, an operating signal corresponding to the rotational operation distance for the actuator 112 is calculated. This operating signal is a digital signal and converted into an analog signal by the digital/analog (to be referred to as "D/A" hereinafter) converter 142 that converts digital signal into analog signal. The converted analog signal is entered to a VCM driver 150. In the VCM driver 150, the operating signal that is converted into an analog signal is then further converted to a drive current for driving the VCM 111 that operates the actuator 112, and output to the VCM 111. Note that the D/A converter 142 can be mounted in the VCM driver 150 circuit. In this case, in the micro-controller 140, the operating signal is output to the VCM driver 150 as it is, and converted to an analog signal in the driver 150 circuit.

The drive current that has been converted in the VCM driver 150 is supplied to the VCM 111. By the repulsion force of the magnet applied by this drive current input in the VCM 111, the actuator 112 rotates through a predetermined angle. Namely, the head 110 holding on the top of the actuator 112 is moved to a destination head position to the direction of the radius of the disk 100.

The above series of operations are repeated one by one at each sampling interval every time when servo data is read by the head 110.

Figure 2:
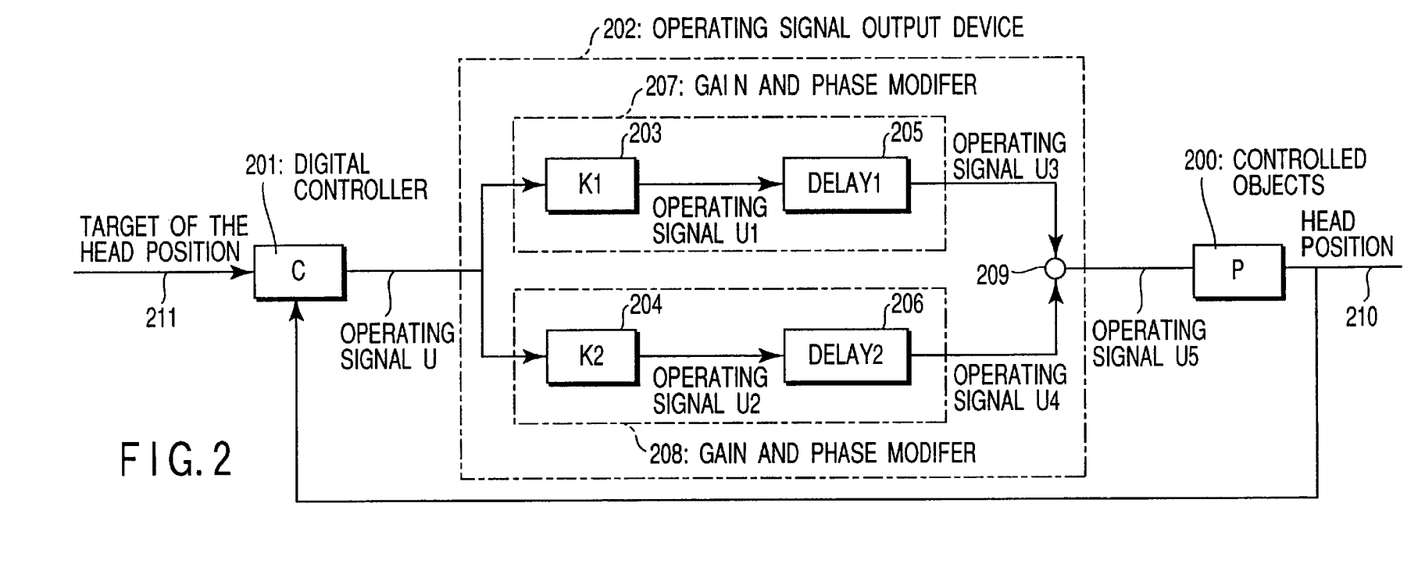
FIG. 2 is a block diagram illustrating the control system in the micro-controller shown in FIG. 1 for positioning the head above a desired position.

FIG. 2 is a block diagram illustrating the control system in the micro-controller of FIG. 1 for positioning the head above a desired position.

In the control system of FIG. 2, the operating signal output from the position-detecting circuit 132 is entered to a digital controller (C) 201. The digital controller (C) 201 digitally calculates the operation amplitude for rotating the actuator 112 in order to drive the head 110 for moving to a destination head position. The operating signal U calculated by the controller (C) 201 is entered to an operating signal output device 202. In this output device 202, the operating signal U is distributed to two signal lines, and values of the gain and phase of the operating signal U are modified into a predetermined values. Those adjusted operating signals U3 and U4 are combined and output to the controlled objects (P) 200. In the present case, the actuator 112 operated by the VCM 111 as supplier for driving force and the VCM driver 150 circuit are the controlled objects (P) 200.

In the controller (C) 201, an operating signal U that is necessary for the seek control and track following control for moving the head position 210 to a target of the head position 211 is calculated. The controller (C) 201 includes a controller that executes the algorithm with which the operating signal U is calculated. In this controller, a input signal is input to different controllers, depending on whether the signal is for seek control or track following control for positioning a head. Namely, as controllers there are two controllers that execute two algorithms for calculating the operating signal in seek control and track following control.

In the operating signal output device 202, the operating signal U calculated by the controller (C) 201 is distributed to two signal lines. The gain of each signal in the two lines is adjusted by multipliers 203 and 204 and converted to operating signals U1 and U2. Next, the phases of operating signals U1 and U2 are adjusted by delay units 205 and 206 and converted to operating signals U3 and U4. An adder 209 adds the operating signals U3 and U4 (namely, U3 is superimposed on U4) and a resultant signal output from adder 209 is input to the controlled objects (P) 200 as operating signal U5. In this case, the adding includes the operation of subtraction between two signals, when two or more inputs are input, computed and output.

The operating signal output device 202 has two multipliers 203 and 204. In the multiplier 203, the operating signal U, output from the digital controller 201, is multiplied by a coefficient K1 to change the gain in U. On the other hand, in the multiplier 204, the operating signal U is multiplied by a coefficient K2 to change the gain in U, where a relation K1+K2=1 is fulfilled. The outputs of multipliers (203 and 204) are input to delay units (205 and 206), respectively. In the delay unit 205, the phase of the operating signal U1, namely, the output from multiplier 203, is delayed for time of DELAY1. In the delay unit 206, the phase of the operating signal U2, namely, the output from multiplier 204, is delayed for time of DELAY2. The part of the circuit consisting of the multiplier 203 and the delay unit 205 is called gain and phase modifier 207. The part of the circuit consisting of the multiplier 204 and the delay unit 206 is called gain and phase modifier 208. The configuration of multiplier 203 and delay unit 205, and multiplier 204 and delay unit 206, can be reversed. In other words, gain can be changed after phase has been delayed in modifiers 207 and 208. An adder 209 is configured after the delay units 205 and 206. In the adder 209, operating signals U3 and U4 are added up to be the result U5 as an output to the latter process. This operating signal U5 becomes an input to the controlled objects (P) 200.

Under this configuration, gain and phase are adjusted in two signals and the adjusted signals are added up during one sampling interval. Due to this operation, a frequency in case that phases are 180-degree different from each other in the two signals is determined. Also the gain in the frequency is determined. As a result, the above-mentioned operation between the two signals can reduce gain corresponding to one frequency after one sampling interval.

If the two above-mentioned signals are generalized and expanded to many signals, a gain and phase modifier is configured on each signal line, and the gain and phase characteristics are changed there. The gain and phase of those operating signals have been modified at each signal line and the adder adds those signals in order to yield the operating signal output to the controlled object. Then the gain of each frequency determined due to the gain and phase characteristics of each signal line can be reduced. Therefore the gain at the desired frequency can be lowered. As a result, at many desired frequencies, each gain can be reduced during one sampling interval. In other words, without increasing the number of servo areas 102 for each track (namely, without shortening the sampling interval), gains at arbitrary many frequencies can be lowered. In general, the output of a single operating signal equal to many operating signals per one sampling interval can be obtained. Namely, since the number of operating signal outputs is substantially increased, a notch filter that works on many frequencies higher than the Nyquist Frequency of digital servo can be provided.

Further, a digital control based on digital processing is realized by this digital servo system. Since it does not need components that are required in an analog circuit, fluctuation in the output characteristics is eliminated. It becomes easy to set the output characteristics desired. For example, upon seek control and track following control, the characteristics of the notch filter can be easily changed. In particular, it becomes possible to easily change the gain and phase characteristics of operating signals in the corresponding signal lines with the above gain and phase modifiers 207 and 208. Therefore, in order to change the gain characteristics, a coefficient specific to the corresponding signal line is multiplied. In order to change the phase characteristics, a delay unit specific to the corresponding signal line is employed. The frequency characteristics are changed by modifying those gain and phase characteristics. The frequency characteristics, therefore, can be easily changed by replacing the coefficient and the delay time as new values corresponding to a desired frequency characteristics. It can also be selective whether the operating signal calculated by the digital controller 201 will pass through or not the operating signal output device 202 in cases of seek control or track following control. By this selection, local peaks in the gain can be lowered. Due to this adjustment of the gain-peak reduction characteristics, the gain and phase characteristics suitable to each control can be provided.

Figure 3:
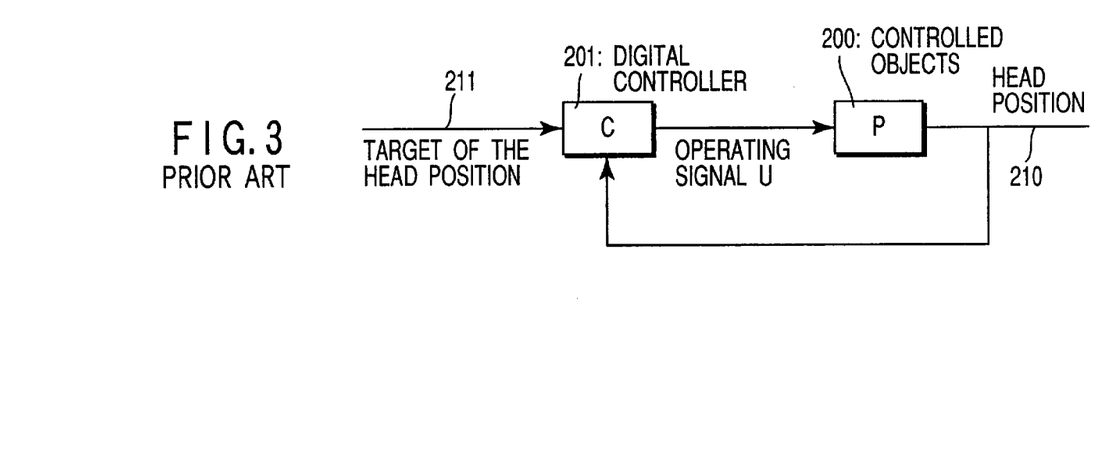
FIG. 3 is a block diagram illustrating the control system of prior art for positioning the head above a desired position.

For comparing this invention with, the control sequence block diagram of a control system for positioning a head of prior art is shown in FIG. 3. Referring to FIG. 2 and FIG. 3, it is well understood that the operating signal output device 202 has been newly added in FIG. 2. Described in more detail, the operating signal output device 202 is newly inserted between the digital controller (C) 201 and the controlled objects (P) 200, namely, multipliers 203/204 and delay units 205/206 and adder 209 are added as shown in FIG. 2.

Next, the operations of the control system for positioning a head shown in FIG. 1 and FIG. 2 are explained below. First, the target position 211 to which the head should be positioned is calculated by the micro-controller 140. The information about this target position 211 is also entered in the controlled objects (P) 200.

The head 110 reads out servo data from the servo areas 102 at a specific sampling interval in the HDD. From the servo data, the position-detecting circuit 132 extracts cylinder address and burst data. In the micro-controller 140, then head position 210 is calculated, based on the cylinder address and the burst data. In this way, the information about the head 110 position and the target position 211 is entered in the controller (C) 201. The operating signal for seek control and track following control is calculated to move the head 110 to the target position 211, and this operating signal U is output to the next step. In this case, when the head position 210 is at least one track distant from the target position 211, the controller for seek control is selected. If the head 110 position already exists above the track of the target position 211, the track following controller is selected for setting the head position 210 precisely at the target position 211. PID (proportional-plus-Integral-plus-Derivative controller) is a representative example of control devices for track following control.

As described above, the control system for positioning a head changes depending on the magnitude of the distance between the head position 210 and the target position 211. In general, controllers in the control unit are selectively used for either seek control or track following control as required. Therefore the conventional systems may also employ the above methods.

The embodiment of the present invention is featured by the operating signal output device 202 which is configured after the conventional controller (C) 201 that outputs one operating signal per one sampling interval. In the operating signal output device 202, an operating signal U5 is generated from the operating signal U sent from the controller (C) 201. This operating signal U5 is entered to the controlled objects (P) 200. By this operating signal U5, the gain in a desired frequency can be reduced.

Figure 4:
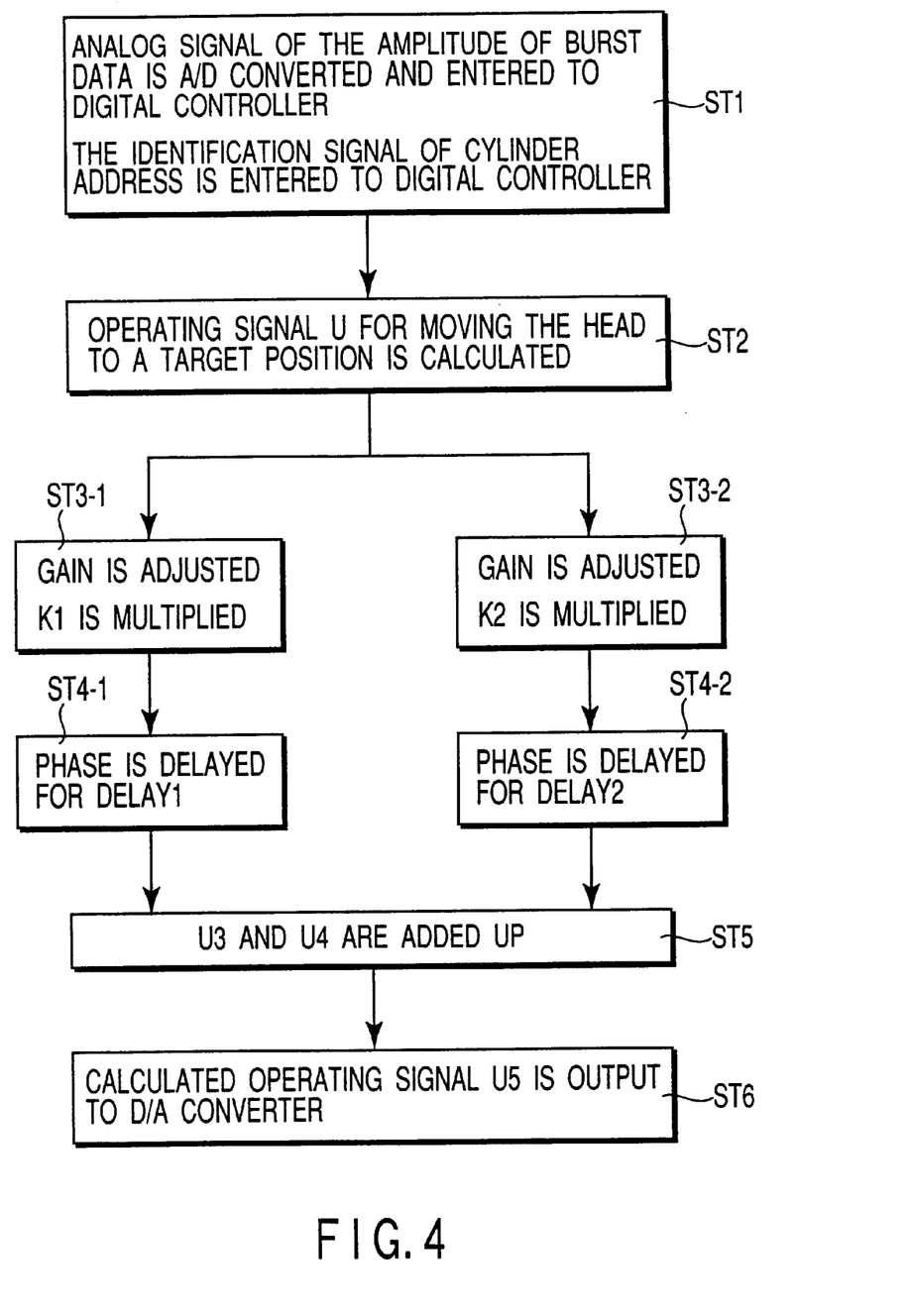
FIG. 4 is a flow diagram illustrating the head control steps performed in the digital controller and the operating signal output device shown in FIG. 2.

FIG. 4 is a flow diagram illustrating the head control steps performed at the digital controller and the operating signal output device shown in FIG. 2.

First, an analog signal having the information about the amplitude of the burst data is A/D converted, and the identification signal of the cylinder address is entered to the controller (C) 201 without being changed (step 1). Next, in the controller (C) 201, the operating signal U for moving the head to a target position is calculated (step 2). The operating signal U is then distributed to and entered into two signal lines by the operating signal output device 202. The two operating signals U after being distributed are multiplied by coefficient K1 and K2, respectively, in multipliers 203 and 204, and thereby the gain characteristics of the operating signals U are modified (step 3-1 and step 3-2). The calculation result obtained by multiplying the operating signal U by coefficient K1 becomes the operating signal U1 (step 3-1). The calculation result obtained by multiplying the operating signal U by coefficient K2 becomes the operating signal U2 (step 3-2). In order to change the phase characteristics, the operating signals U1 and U2 are entered to delay units 205 and 206 corresponding to delay time of DELAY1 and DELAY2 respectively. Each of the phase characteristics of operating signals U1 and U2 is changed independently and sent to the next step as operating signals U3 and U4 (step 4-1 and step 4-2).

In the following step 5, the operating signals U3 and U4 are entered to the adder 209. The adder 209 adds up these operating signals U3 and U4 to yield a new operating signal U5 (step 5). This operating signal U5 is D/A converted and then entered to the controlled objects (P) 200 (step 6).

Referring now to FIGS. 5A to 7B, a specific example for controlling operations for positioning a head is explained along with the accompanying frequency characteristics.

For example, assuming that K1=0.55, K2=0.45, Delay1= 10 $\mu$s and Delay2=100 $\mu$s, an embodiment of the present invention is explained below.

Figure 5A:
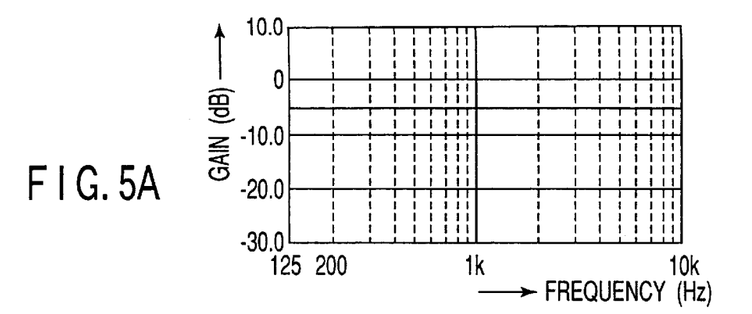
FIGS. 5A and 5B are the diagrams illustrating the frequency characteristics of gain and phase in the upper flow of the operating signal output device shown in FIG. 2.
Figure 5B:
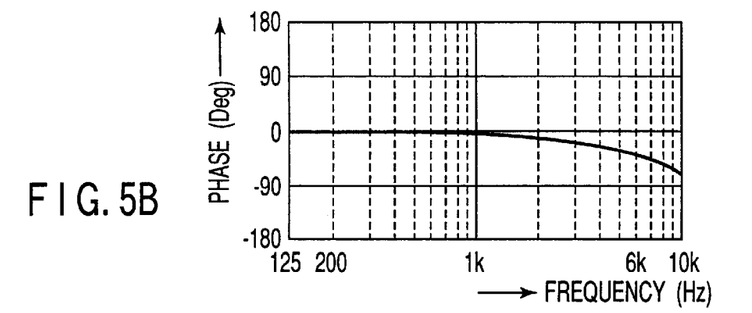

In this case, the relationship between frequency and gain/phase characteristics in the operating signal U3 become those shown in FIGS. 5A and 5B, where frequency is plotted on a logarithmic scale. FIG. 5A, illustrating the gain characteristics, indicates that gain becomes smaller than 0 dB by setting K1 at 0.55. On the other hand, FIG. 5B, illustrating the phase characteristics, indicates that phase is delayed by about 45 degrees at around 6 kHz by setting DELAY1 at 10 $\mu$s.

Figure 6A:
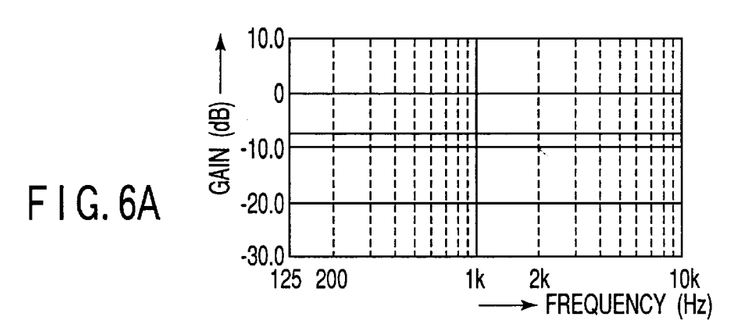
FIGS. 6A and 6B are the diagrams illustrating the frequency characteristics of gain and phase in the lower flow of the operating signal output device shown in FIG. 2.
Figure 6B:
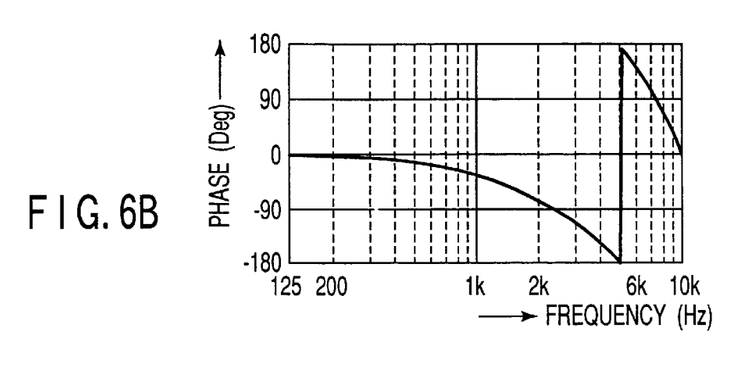

On the other hand, the relationship between frequency and gain/phase characteristics in the operating signal U4 are shown in FIGS. 6A and 6B. As is the case with FIG. 5A, FIG. 6A shows gain characteristics. FIG. 6A indicates that gain becomes lower than 0 dB by setting K2 at 0.45. Further, it is also smaller than the gain in FIG. 5A where K1=0.55. FIG. 6B, illustrating the phase characteristics, indicates that phase is delayed by about 225 degrees at around 6 kHz by setting DELAY2 at 100 $\mu$s.

Note that in the phase characteristics shown in FIG. 5B and FIG. 6B, there is a phase difference of about 180 degrees between the U3 and U4 at around 6 kHz. A phase difference of 180 degrees implies that operating signals U3 and U4 have phases which are inverted to each other at around 6 kHz. As a result, when U3 and U4 are entered to the adder 209, the gain at around 6 kHz is thereby lowered.

Figure 7A:
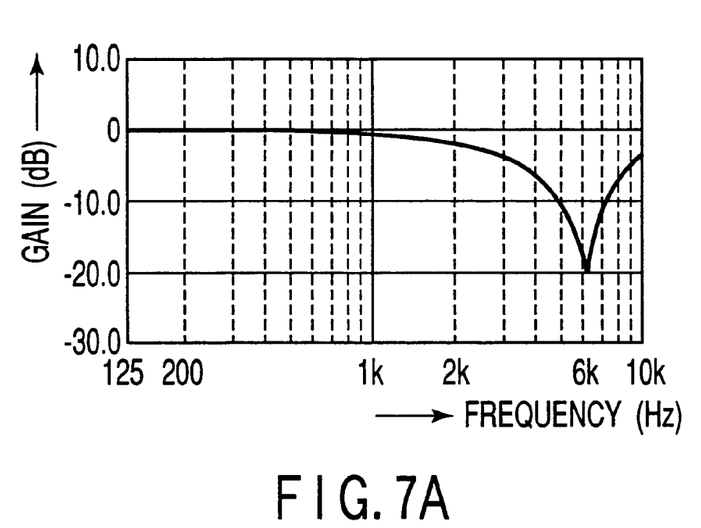
FIGS. 7A and 7B are the diagrams illustrating the frequency characteristics of gain and phase appearing after the addition of operating signals U3 and U4 shown in FIG. 2, each having the frequency characteristics of FIGS. 5A–5B and FIGS. 6A–6B.
Figure 7B:
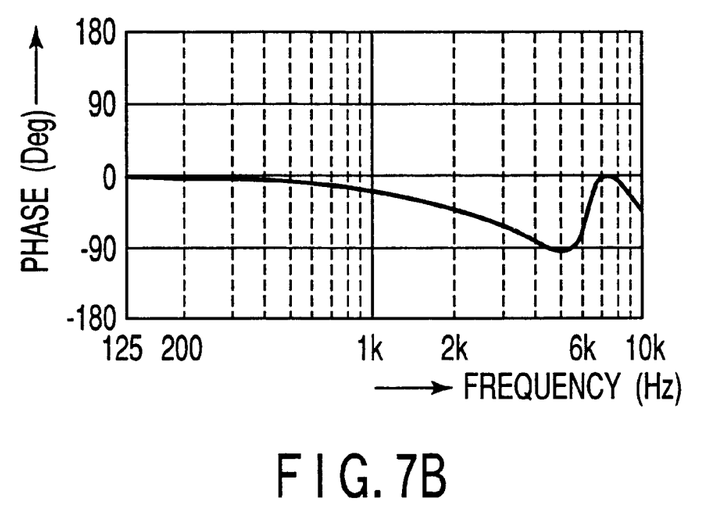

FIGS. 7A and 7B are the diagrams illustrating the frequency characteristics of operating signal U5 which is obtained by adding operating signals U3 and U4 each having the frequency characteristics shown in FIGS. 5A, 5B, 6A and 6B, respectively. FIG. 7A, illustrating the gain characteristics, indicates that on the curve represents a notch-like valley at around 6 kHz where operating signals U3 and U4 are relation with inverse phases, implying that gain has been lowered.

As described above, in the embodiment of the invention, the operating signal U is distributed to and entered into two signal lines, and in each signal line the gain and phase of the operating signal U are modified. Then the operating signals U3 and U4 on each signal line are added. The operating signals U3 and U4 become again single signal. As a result, the gain is lowered at a frequency where the phases of signals in the two signal lines are inverted each other.

It is also possible to set the delay time for each signal line at an arbitrary value that does not depend on its sampling frequency. In the operating signal output device 202, the frequency where gain will be reduced can be determined by the difference in the phase characteristics of signals between the two signals having delay time of DELAY1 and DELAY2, respectively. Then gain-peaks that appear in frequencies higher than the Nyquist Frequency can be controlled as desired. The control of the head becomes less unstable because the mechanical resonance phenomenon of the actuator 112 is prevented, and the noise caused by seek control is also reduced. The gain-peak reduction rate, namely, a rate of the post-reduced gain per the pre-reduced gain at a gain-peak, can be set as desired based on the difference in gains in the two signal lines, each gain determined by coefficients K1 or K2.

The reduction of the mechanical resonance of the actuator 112 in seek control is ensured by appropriate setting of each parameter in the operating signal output device 202, as described in the above embodiment. The control itself becomes unstable less frequently. Therefore seek noise can be also reduced. With the above method, however, a high-speed track following control cannot be realized because the phase is delayed, even if the controller for track following control has been selected in the controller (C) 201. Therefore, in track following control, parameters are set as K1=1 and K2=0, and DELAY1=0 and DELAY2=0. In other words, the operating signal U output from the controller (C) 201 is input to the controlled objects (P) 200 without being changed. This setting provides a quicker response. For modification of those coefficients and delay time, a micro-controller 140, for example, is employed.

Otherwise, this modification can be controlled by the micro-controller 140 due to input of the output signal from the controller (C) 201. The controller 140 can also control a switching unit that switches between entering operating signal U to the operating signal output device 202 and directly to the controlled objects (P) 200. In the case of seek control, the operating signal U is entered to the operating signal output device 202 without being changed. Based on this operating signal U, the operating signal U5 is entered to the controlled objects (P) 200. On the other hand, in the case of track following control the operating signal U is entered to the controlled objects (P) 200 without being changed. Namely, the operating signal output device 202 works exclusively for track following control, and the operating signal U is entered to the operating signal output device 202 only when the type of control is seek control.

In the above embodiment of the invention, the operating signal U is distributed to and entered into two processing signal lines, and operating signals are output equally more than once during a single sampling interval in the operating signal output device 202. In the present embodiment, it has been described that the gain-peaks in one frequency band is reduced (a frequency band including 6 kHz). The effect of the present invention, however, is not limited to the case in which an operating signal U is distributed to two signal lines. For example, it is also possible that the operating signal U output from the controller (C) 201 is distributed three or more signal lines, and then gains in more than one frequency are reduced. In such case, the gain and phase in each signal line are modified, and another operating signal output device 202 is employed which adds up the operating signals in many signal lines to one signal in a single signal line. In other words, this operation of operating signal output device 202 is equal to output at least three operating signals during one sampling interval. In most cases, the mechanical resonance of an actuator 112 has gain-peaks in more than one frequency band. For reduction of those gain-peaks, it is effective to distribute the operating signal U to at least three signal lines, as described above. The actuator 112 indicates seldom instability of control due to mechanical resonance when each gain-peak is thereby lowered. Further, seek noise is also damped. Note that in order to attain the best result by such an operating signal output device 202 that will reduce the gain of a single frequency band, such a single frequency band that has the largest gain-peak should be selected from many frequency bands having a gain-peak.

As described above, the present invention has an advantage that operating signals can be output equally at least twice during a single sampling interval. Also it can provide a notch filter that reduces gains in frequencies higher than the Nyquist Frequency of digital servo, while using digital servo systems. As a result, the mechanical resonance of the actuator 112, which increases noise and instability in seek control, is effectively reduced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A control system for moving a data-reading object reading data from a recording medium, to a target position in accordance with a position data read by the data-reading object, said control system comprising:

a first control section generating a first operation signal for moving the data-reading object; and an output section distributing the first operation signal to a plurality of signal lines, said output section comprising:

a plurality of changing sections changing a gain and phase characteristics of the first operation signal generated by the first control section and generating second operation signals; and an adding section adding each of the second operation signals generated by said changing sections, thereby generating a third operation signal which has a gain-peak lower than that of the first operation signal, and outputting the third operation signal as a control signal controlling the data-reading object as a controlled object, wherein each of said changing sections includes:
a gain-characteristic changing unit changing the gain characteristic of the first operation signal by multiplying the first operation signal by a specific coefficient; and
a phase-characteristic changing unit changing the phase characteristic of the first operation signal by applying a delay time specific to one signal line,
wherein the coefficient and delay time are set in accordance with a frequency band in which the first operation signal has a gain-peak; and
a second control section changing the coefficient, thereby to determine how much the gain is to be reduced, and changing the delay time, thereby to set a frequency band in which a gain-peak is to be lowered,
wherein said second control section sets a phase difference between the second operation signals of two of the signal lines, at about 180 degrees at the frequency band where the gain-peak should be lowered.

2. A control method for moving a data-reading object reading data from a recording medium, to a target position in accordance with a position data read by the data-reading object, said control method comprising:
generating a first operation signal for moving the data-reading object; and
distributing the first operation signal to a plurality of signal lines, said distributing comprising:
changing a gain and phase characteristics of the first operation signal and generating second operation signals; and
adding each of the second operation signals generated in said changing step, thereby generating a third operation signal which has a gain-peak lower than that of the first operation signal, and outputting the third operation signal as a control signal controlling the data-reading object as a controlled object,
wherein the gain characteristic of the first operation signal is changed by multiplying the first operation signal distributed to each signal line by a specific coefficient, and the phase characteristic of the first operation signal is changed by a delay time specific to each signal line,
wherein the coefficient and delay time are set at values corresponding to the frequency band in which the first operation signal has a gain-peak value,
wherein the coefficient is changed to determine how much the gain is to be reduced, the delay time is changed, thereby to set a frequency band in which a gain-peak is to be lowered, and
wherein a phase difference between the second operation signals of two of the signal lines is set at about 180 degrees at the frequency band where the gain-peak should be lowered.

3. A control system for moving a data-reading object reading data from a recording medium, to a target position in accordance with a position data read by the data-reading object, said control system comprising:
a first control section generating a first operation signal for moving the data-reading object; and
an output section distributing the first operation signal to a plurality of signal lines, said output section comprising:
a plurality of changing sections changing a gain and phase characteristics of the first operation signal generated by the first control section, and generating second operation signals; and
an adding section adding each of the second operation signals generated by said changing sections, thereby generating a third operation signal which has a gain-peak lower than that of the first operation signal, and outputting the third operation signal as a control signal controlling the data-reading object as a controlled object,
wherein each of said changing sections includes:
a gain-characteristic changing unit changing the gain characteristic of the first operation signal by multiplying the first operation signal by a specific coefficient; and
a phase-characteristic changing unit changing the phase characteristic of the first operation signal by applying a delay time specific to one signal line; and
a second control section changing the coefficient, thereby to determine how much the gain is to be reduced, and changing the delay time, thereby to set a frequency band in which a gain-peak is to be lowered.

4. A control method for moving a data-reading object reading data from a recording medium, to a target position in accordance with a position data read by the data-reading object, said control method comprising:
generating a first operation signal for moving the data-reading object; and
distributing the first operation signal to a plurality of signal lines, said distributing comprising:
changing a gain and phase characteristics of the first operation signal and generating second operation signals; and
adding each of the second operation signals generated in said changing step, thereby generating a third operation signal which has a gain-peak lower than that of the first operation signal, and outputting the third operation signal as a control signal controlling the data-reading object as a controlled object,
wherein the gain characteristic of the first operation signal is changed by multiplying the first operation signal distributed to each signal line by a specific coefficient, and the phase characteristic of the first operation signal is changed by a delay time specific to each signal line,
wherein the coefficient and delay time are set at values corresponding to the frequency band in which the first operation signal has a gain-peak value,
wherein the coefficient is changed to determine how much the gain is to be reduced, the delay time is changed, thereby to set a frequency band in which a gain-peak is to be lowered.

* * * * *